March 30, 1937.  W. H. COLES ET AL  2,075,702
IRRIGATION DEVICE
Filed Nov. 29, 1935  2 Sheets-Sheet 1

Inventor
Walter H. Coles and
Bert J. Nelson
By Maréchal & Noe
Attorney

March 30, 1937.  W. H. COLES ET AL  2,075,702
IRRIGATION DEVICE
Filed Nov. 29, 1935   2 Sheets—Sheet 2
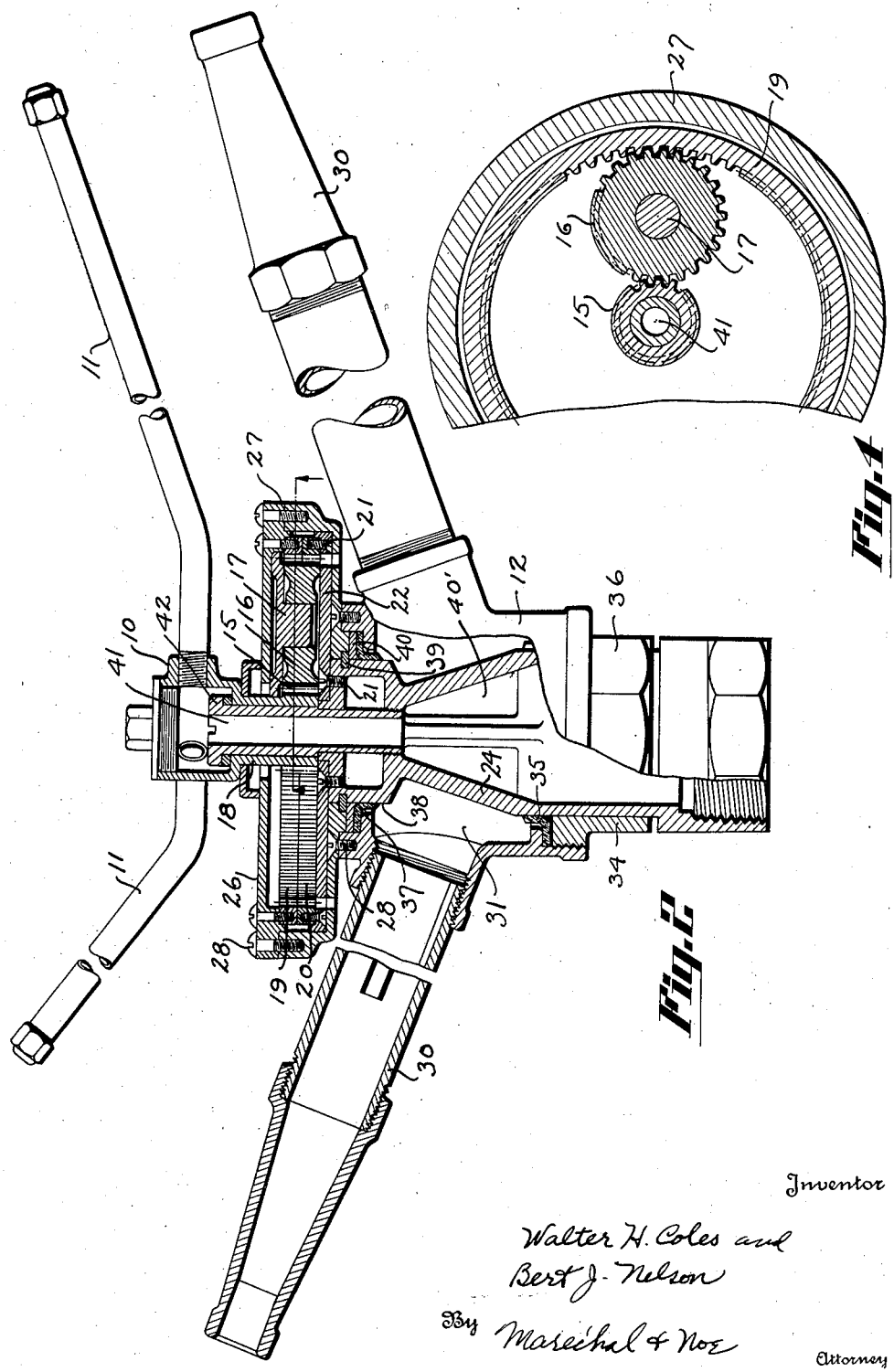
Inventor
Walter H. Coles and
Bert J. Nelson
By Maréchal & Noe
Attorney Patented Mar. 30, 1937

2,075,702

UNITED STATES PATENT OFFICE 2,075,702

IRRIGATION DEVICE

Walter H. Coles and Bert J. Nelson, Troy, Ohio, assignors to The Skinner Irrigation Company, Troy, Ohio, a corporation of Ohio Application November 29, 1935, Serial No. 52,063

7 Claims. (Cl. 299—69)

This invention relates to water distributors and more particularly to rotatable distributing devices for watering or sprinkling large areas of the ground.

One object of the invention is the provision of a rotatable water distributor of very large capacity, in which the large thrust and reaction forces are balanced in all directions.

Another object of the invention is the provision of a water distributing means which is movable at a comparatively slow rate of travel, and in which the axial thrust force exerted in a downward direction by the reaction of the issuing stream or streams of water is opposed and substantially equalized by the water pressure exerted within the head, the upper and lower points of engagement of the distributing head and the supporting standard being so coordinated with one another as to relative size and so coordinated with the downward thrust on the head as to oppose and substantially equal this thrust.

Other objects and advantages of the invention will be apparent from the following description, the appended claims and the accompanying drawings, in which—

Fig. 2 is a side elevation of the water distributing device shown partly in vertical section;

Fig. 4 is a horizontal section on the line 4—4 of Fig. 2; and

Referring more particularly to the drawings, the invention as herein shown is particularly adapted for large size water distributing devices, the particular construction disclosed being adapted for mounting on the upper end of a vertical water pipe, which may extend up to a considerable height so that the outwardly and upwardly directed streams issuing from the distributor will be thrown to a comparatively large radius.

Figures 1, 5:
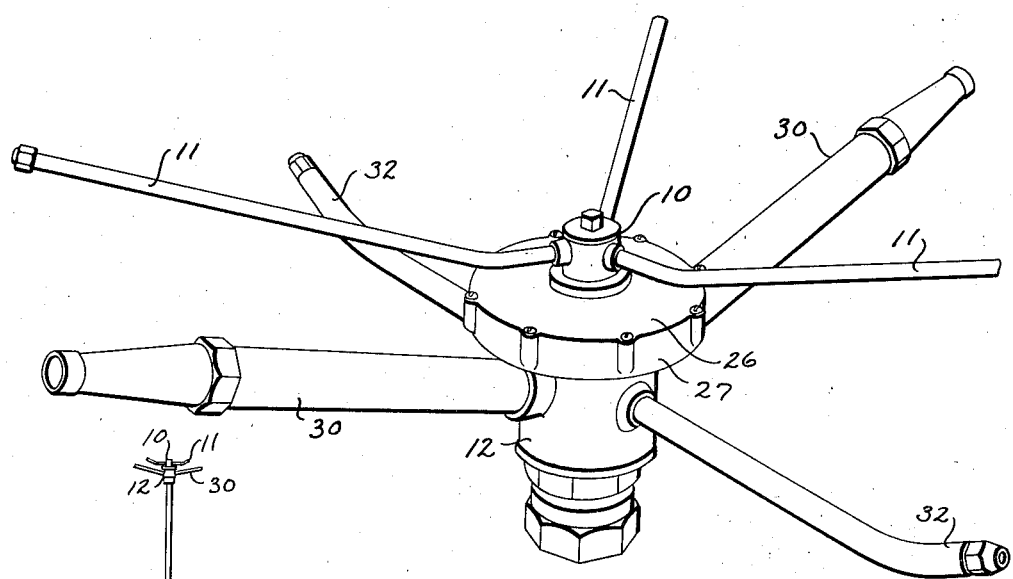
Fig. 1 is a perspective view of a water distributing device embodying the present invention.
Fig. 5 is a view of a distributing system in which a distributing device is mounted at the top of a tall vertical pipe.
Figure 3:
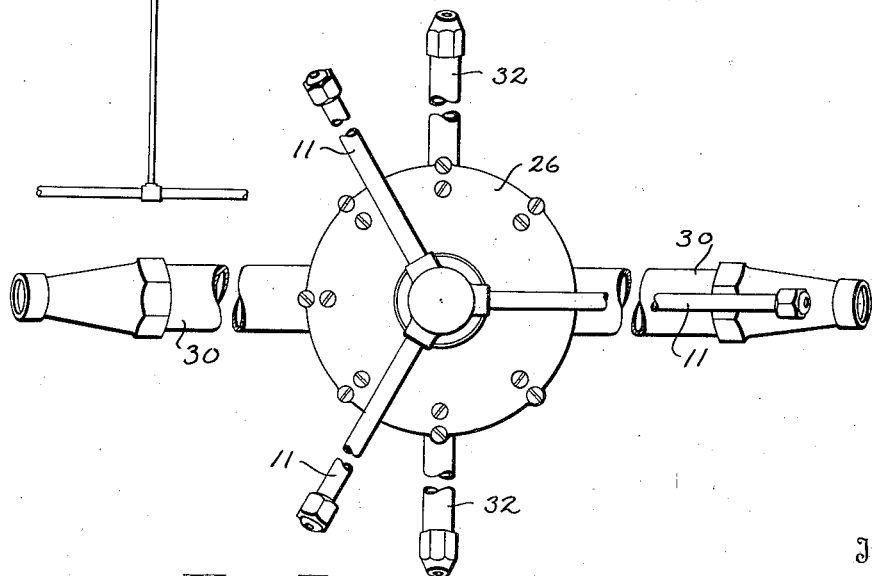
Fig. 3 is a top plan view of the water distributing device.

The device, as will be apparent from Fig. 1, comprises a rotatable reaction head 10 having a plurality of outwardly and upwardly extending pipes 11, herein shown as three in number. These pipes 11 extend at a slight angle to a true radial line, so that there will be some substantial reaction force created on the reaction head 10, moving it at a substantial speed which may be of the order of 100 revolutions per minute. However, this speed of revolution may be either increased or decreased to a great extent by changing the angularity of the pipes 11 with respect to a radial line and thus changing the reaction force created on the head 10.

The comparatively rapid rotation of the reaction head 10 produces a very slow rotation of the main water distributing head 12. The heads 10 and 12 are interconnected by suitable reduction gearing as shown in Fig. 2. While this interconnection between the heads 10 and 12 may be of any desired character to produce a comparatively slow rotation of the main distributing head 12, as herein shown, the interconnection is a geared reduction drive including a gear 15 fixed on the stem portion of the head 10 and meshing with an idler gear 16 which is suitably journalled for rotation on a stud provided on a circular plate 17 that can move around the stem portion 18 of the head 10, rolling on the inside wall of the housing and serving to keep the center of gear 16 midway between the teeth of the gears with which it engages, and preventing any binding tendency. The idler gear acts as a planetary gear, meshing with two large internally toothed gears 19 and 20. Gear 20 is stationary, being connected by screw 21 and plate 22 to the fixed standard 24 on which the main distributing head 12 is supported. The gear 19 is secured to the top plate 26 of the rotatable housing 27, which is fastened by screws 28 to the distributing head 12. The two gears 19 and 20 have a different number of gear teeth, one of the gears having one more tooth than the other so that as the gear 16 is rotated about its own axis and about the axis of the gear 15, there is a very slow rotational movement of the housing 27 and of the head 12 produced from the comparatively rapid rotational movements of the upper reaction head 10.

The head 12 may turn one revolution every five minutes or so to throw a large stream or streams of water from a nozzle or nozzles with which it is provided. While only one nozzle may be used if the device is arranged on the top of a rigid tower, it is preferred, as shown, that the head 12 have a plurality of opposed large capacity distributing nozzles 30 which extend in diametrically opposite directions preferably radially outward and upward from the central chamber 31 of the main distributing head 12. Such a device can therefore be used at the top of a pipe thirty feet or more in height and about two and one-half inches in diameter, as illustrated in Fig. 5, to distribute the water without creating a weave or bend or vibration in the supporting pipe. The capacities of the two main nozzles 30 are preferably the same so that reaction forces in a direction transverse to the axis of rotation balance one another. The reaction force of the issuing streams coming from the two nozzles 30, however, produces a comparatively large vertical downward component of force on the main distributing head 12. Two additional nozzles 32, of smaller capacity than the nozzles 30, are preferably employed so as to throw two streams of water at a somewhat different spacing from the axis of rotation. These two nozzles extend in diametrically opposite directions. The total vertical downward reaction force produced by the two large streams issuing from the nozzles 30, and from the streams issuing from the pipes 32 is equalized and opposed by reason of the particular bearing and sealing connection employed, as will now be described.

The fixed standard 24, which is preferably internally threaded at its lower end so that it may be screwed on the top of a vertical water pipe, provides a plurality of bearing connections for the rotatable head 12. The lower bearing connection is shown as a suitable sleeve bearing 34. Leakage of water from the chamber 31 down along the bearing sleeve is prevented by a soft packing washer 35 of leather or other suitable material, the washer being clamped between the main portion of the head 12 and the bearing sleeve portion 36 which is in threaded engagement therewith. The upper bearing engagement and upper sealing connection which is arranged at the upper end of the fixed standard 24 has a diameter somewhat less than the diameter of the sealing connection 35, and so coordinated with it and with the reaction force produced by the streams issuing from the main distributing head, as to oppose and substantially equalize such reaction force. That is, under normal pressure conditions for which the sprinkler is intended, the upward and downward forces on the distributing head are in balance. Of course if the pressure of the water differs greatly from normal pressure there will be some very slight out of balance because the weight of the sprinkling member, which acts vertically downward, is a constant, but the weight of the sprinkling member is comparatively small as compared to the water reaction forces so that the forces are substantially equalized under the usual operating conditions. The upper bearing connection is sealed by a flexible packing strip 37, which engages the cylindrical surface 38 on the upper portion of the fixed standard. Provided in an annular groove in the fixed standard is a split bearing ring 39 forming a bearing surface for engagement with the top of the bearing disk 40 which is provided on the upper side of the sealing strip 37, and with the bottom of the housing 27.

The water supplied to the inside of the fixed standard passes through openings 40' into the chamber 31 and from the chamber 31 is distributed through the nozzles 30 and through the pipes 32 in four radial streams. Some of the water passes directly up through the passage 41 in the hollow fixed stem 42 and flows out through the three reaction arms 11.

The two nozzles 30 direct the main streams of water radially outward and upward, the slow rotation of the head 12 providing for the maximum throw of water to give maximum ground coverage. The streams issuing from the pipes 32 are also preferably radially directed, although if desired these streams may be directed at a very slight angle to a radial line so as to produce a reaction force opposed or helping the turning action imparted by the reaction head 10. The two streams issuing from the pipes 32 however balance each other with respect to any force in a direction transverse to the action of rotation so that the only force of reaction created by the streams issuing from the head 12 is a vertical downward reaction force, and as above mentioned this reaction force is balanced and substantially counteracted by the pressure of the water in the chamber 31 tending to blow the whole distributing head upwardly. The relative diameters of the upper and lower points of bearing and sealing engagement between the head and the fixed standard, as previously mentioned, are so chosen as to equalize and substantially balance the downward reaction force produced by the reaction of the issuing streams. This permits the main distributing head to be turned very readily, as the bearing forces and friction are reduced substantially to zero. A very small turning force produced by reason of the angularity of the reaction arms 11 is therefore sufficient to insure a proper turning of the main distributing head 12, at the desired very low speed of operation. And with the forces on the main distributing head balanced in all directions, the distributing device can be supported at the upper end of a very high water pipe without producing vibratory or weaving movements.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A water distributor comprising a fixed standard, a water supply head rotatably mounted on said standard, water distributing means on said head productive of an axial downward reaction thrust force on said head, means supported on said standard and interconnected to said head for causing a slow rotation of said head, said head having upper and lower areas of engagement with said standard so arranged and proportioned with respect to one another and with respect to said downward reaction thrust force as to normally produce a force on said head opposing and substantially equalizing the said reaction thrust force of said water distributing means.

2. A water distributor comprising a fixed standard, a water supply head rotatably mounted on said standard, water distributing means on said head productive of an axial downward reaction thrust force on said head, reaction means rotatably supported on said standard and interconnected to said head for causing a slow rotation of said head, said head having upper and lower areas of bearing engagement with said standard so arranged and proportioned with respect to one another and with respect to said downward reaction thrust force as to normally produce a force on said head opposing and substantially equalizing the said reaction thrust force of said water distributing means.

3. A water distributor comprising a fixed standard, a water supply head rotatably mounted on said standard, a plurality of water supply pipes on said head for distribution of water in outwardly and upwardly directed streams productive of a downward reaction thrust force on said head, said streams being substantially in balance as to forces in radial directions, reaction means rotatably supported on said standard, means interconnecting said reaction means and said head for causing a slow rotation of said head from a comparatively rapid rotation of said reaction means, said head having upper and lower connections with said standard with the effective diameter of the lower connection exceeding the effective diameter of the upper connection and so coordinated therewith and with said downward thrust force as to oppose and substantially equalize said downward thrust force.

4. A water distributor comprising a fixed standard, a water supply head rotatably mounted on said standard, a plurality of water supply pipes on said head for distribution of water in outwardly and upwardly directed streams productive of a downward reaction thrust force on said head, said streams being substantially in balance as to forces in radial directions, reaction means rotatably supported on said standard, gear reduction means interconnecting said reaction means and said head for causing a slow rotation of said head from a comparatively rapid rotation of said reaction means, said head having upper and lower areas of bearing engagement with said standard and having a sealing connection adjacent each bearing, with the effective diameter of the lower connection exceeding the effective diameter of the upper connection and so coordinated therewith and with said downward thrust force as to oppose and substantially equalize said downward thrust force.

5. In a water distributing system, a tall upright distributing pipe reaching to a large height above the ground, and a water distributor mounted at the upper end of said pipe, said water distributor comprising a standard fixed to the upper end of said pipe, a water supply head rotatably mounted on said standard, water distributing means on said head discharging a large stream of water in a radially outward and upward direction and producing a downward reaction thrust force on said head, means supported on said standard and interconnected to said head for causing a slow rotation of said head, said head having upper and lower areas of engagement with said standard so arranged and proportioned with respect to one another and with respect to said downward reaction thrust force as to normally produce a force on said head substantially equalizing the said reaction thrust force of said water distributing means.

6. A water distributor comprising a fixed standard, a water supply head rotatably mounted on said standard, water distributing means on said head, a rotatable reaction member having bearing on said standard, a gear fixed to said reaction member, an idler meshing with said gear, a plurality of concentric gears with a different number of teeth simultaneously meshing with said idler, one of said concentric gears connected to said standard and the other connected to said head for causing slow rotation of said head from a comparatively rapid rotation of said reaction member.

7. A water distributor comprising a fixed standard, a water supply head rotatably mounted on said standard, water distributing means on said head productive of an axial downward reaction thrust force on said head, a rotatable reaction member having bearing on said standard and arranged above said head, a gear fixed to said reaction member, an idler meshing with said gear, a plurality of concentric gears with a different number of teeth simultaneously meshing with said idler, one of said concentric gears connected to said standard and the other connected to said head for causing slow rotation of said head from a comparatively rapid rotation of said reaction member, said head having upper and lower connections with said standard with the effective diameter of the lower connection exceeding the effective diameter of the upper connection.

BERT J. NELSON.
WALTER H. COLES.